G. BERGHAUSEN.
KEY SEAT CUTTING ATTACHMENT FOR DRILL PRESSES.
APPLICATION FILED AUG. 15, 1910.
1,045,501.
Patented Nov. 26, 1912.
2 SHEETS—SHEET 1.
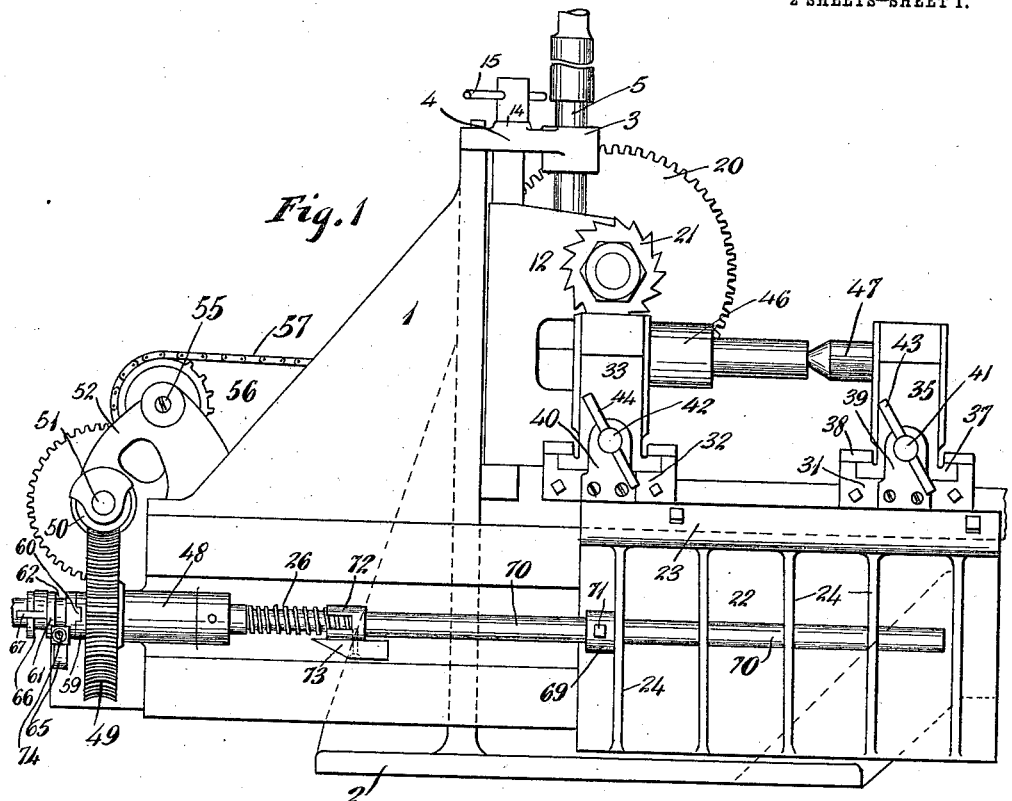
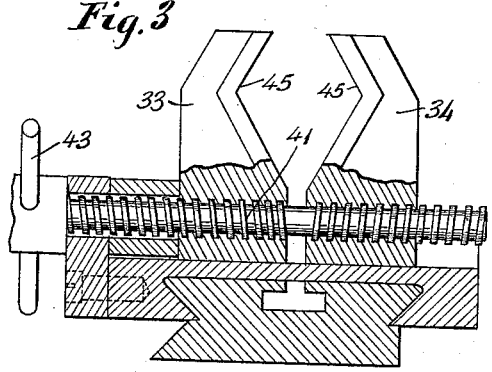
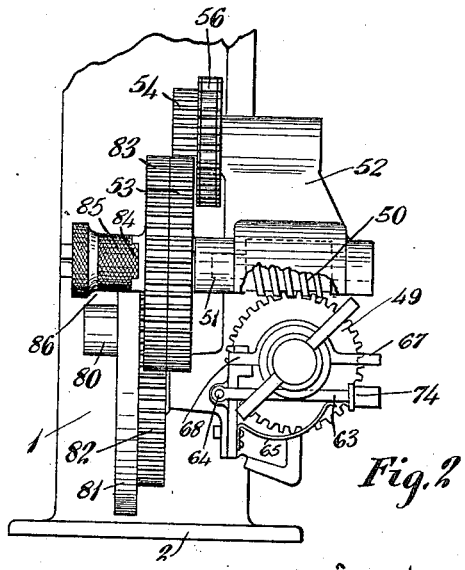

G. BERGHAUSEN.
KEY SEAT CUTTING ATTACHMENT FOR DRILL PRESSES.
APPLICATION FILED AUG. 15, 1910.
1,045,501.
Patented Nov. 26, 1912.
2 SHEETS—SHEET 2.
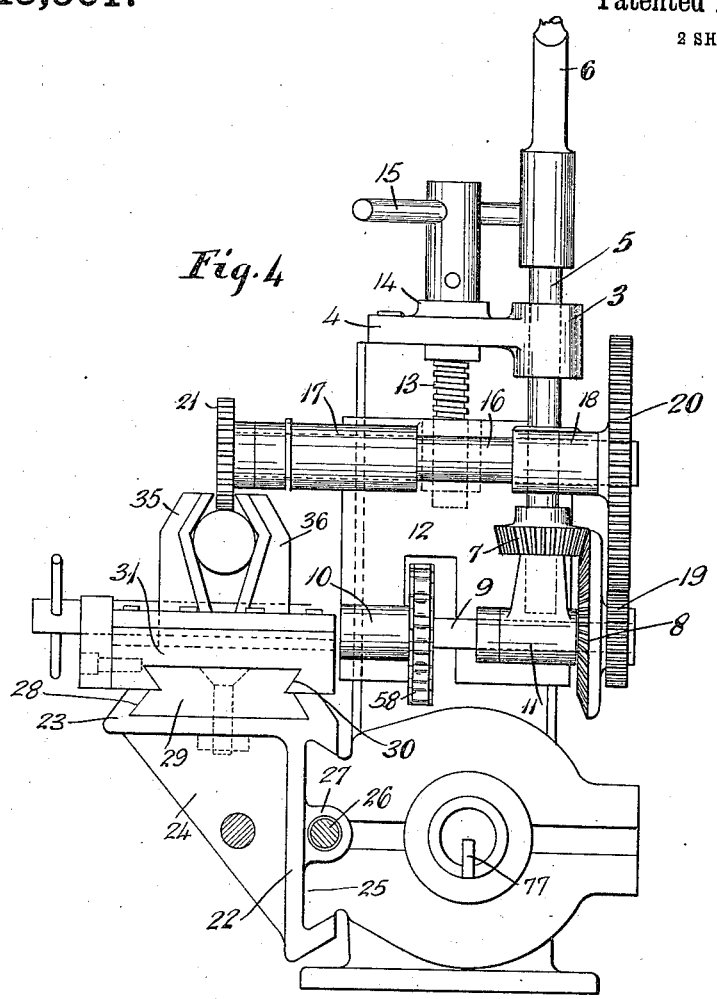
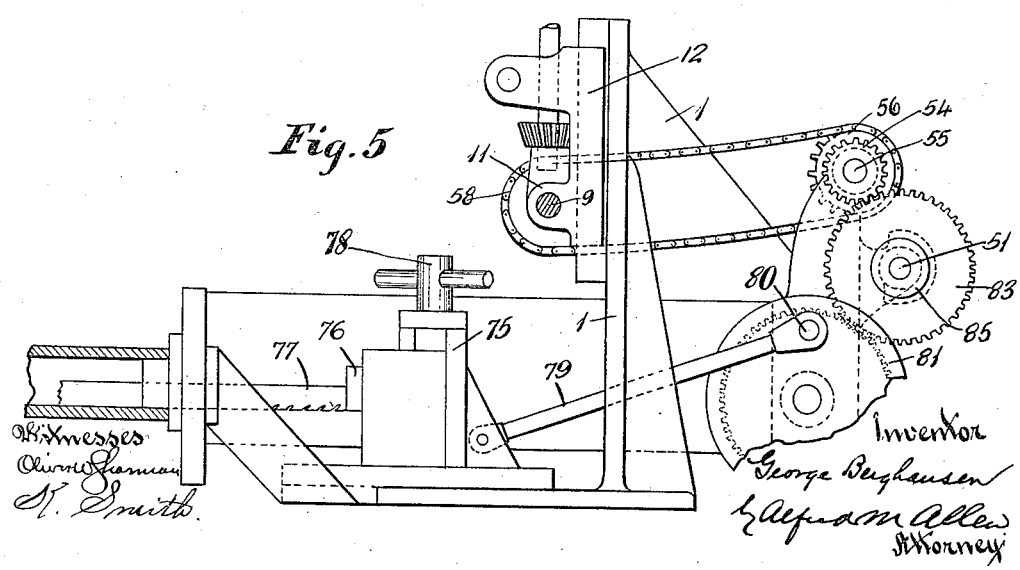

UNITED STATES PATENT OFFICE.

GEORGE BERGHAUSEN, OF CINCINNATI, OHIO, ASSIGNOR TO EDWARD BERGHAUSEN, OF CINCINNATI, OHIO, DOING BUSINESS AS BERGHAUSEN MACHINE COMPANY.

KEY-SEAT-CUTTING ATTACHMENT FOR DRILL-PRESSES.

1,045,501.      Specification of Letters Patent.      Patented Nov. 26, 1912.

Application filed August 15, 1910. Serial No. 577,244.

*To all whom it may concern:*

Be it known that I, GEORGE BERGHAUSEN, a citizen of the United States, and a resident of the city of Cincinnati, in the county of Hamilton and State of Ohio, have invented certain new and useful Improvements in Key-Seat-Cutting Attachments for Drill-Presses, of which the following is a full, clear, and exact description, reference being had to the accompanying drawings, forming a part of this specification.

My invention relates to machines for cutting slots in machine parts, more particularly for cutting key-seats either external or internal in shafting, hubs, collars and the like, and the object of the invention is to furnish a machine for this purpose as an attachment for drill presses which can be readily and easily mounted or supported on the drill press table and connected with the drill chuck or spindle coupling to drive the rotary milling cutter for external seats and the reciprocating saw cutter for internal seats.

The invention consists of the certain novel construction and arrangement of parts to be hereinafter particularly pointed out and claimed whereby the attachment to the drill press may be instantly made, the work securely and effectively clamped in position and automatically fed to the milling cutter to cut any length or depth of slot desired without any further attention from the operator, the mechanism being automatically stopped when the slot or key-seat of the required length has been cut.

In the drawings, Figure 1 is a side elevation of my improved attachment. Fig. 2 is a detail front elevation of a portion of the driving mechanism. Fig. 3 is a transverse section of one of the work holding clamps. Fig. 4 is a rear elevation of the attachment. Fig. 5 is a rear side elevation of the same.

The operating parts are mounted and suitably supported in a substantial standard 1, provided with a substantial base plate 2 which is intended to rest on and when desired be bolted to the bed plate of the drill press. Mounted loosely in the hub 3, carried by the arm 4, bolted on top of the standard 1 is a vertical shaft 5, arranged at its upper end 6 to make connection with a drill press. On the lower end of this vertical shaft or spindle 5 is a beveled pinion 7 which meshes with the beveled gear 8 on the end of the horizontal shaft 9, having its bearings in bosses 10 and 11, which project rearwardly from a plate 12, which is mounted to slide up and down in a dovetailed runway formed on the rear face of the standard 1, and this plate is adjustable vertically by the screws 13 connected therewith in the usual way, the screw being mounted in the boss 14 on the arm 4 and adjusted by the handle 15. The lower end of the spindle 5 has its bearing in an upwardly projecting extension from the boss 11, so that the spindle 5 is mounted in the plate 12, and is adjusted vertically with the movement of the plate 12.

Mounted horizontally above the shaft 9 and parallel thereto is the shaft 16 which has its bearings in the bosses 17 and 18, also projecting rearwardly from the plate 12, so that these two shafts and the gears thereon are capable of vertical adjustment.

On the inner end of the shaft 9 is a pinion 19, which meshes with the gear 20 on the inner end of the shaft 16, while on the opposite or front end of the shaft 16 is mounted the milling rotary cutter 21. It will be evident from the construction so far described, that by the rotation of the spindle 5 by the drill press power through the train of gearing consisting of the miter gears 7, 8, spur gears 19, 20, the milling cutter will be rotated at the desired speed. It will also be evident that by the adjustment of the screw 13, the milling cutter can be adjusted to the proper vertical position, inasmuch as the spindle 5 is loosely mounted in the hub 3 and lengthwise adjustable therein.

For properly holding and feeding the work to this milling cutter, I provide as follows: The clamps for holding the work are mounted on an adjustable frame comprising a vertical portion 22 and a horizontal portion 23 integral therewith, the frame being properly braced by the ribs 24, 24. The rear face of the vertical portion of this clamp holding frame is dovetailed to engage the correspondingly beveled face 25 on the main framework. The clamp holding frame is adjusted lengthwise by means of the screw 26, which is threaded into the boss 27 on the rear face of the clamp framework. The upper face of the horizontal section 23 of the clamp frame is also provided with a dovetailed runway 28 in which is seated a correspondingly beveled plate 29. On this plate 29 is mounted, with a dovetailed connection 30, the clamp plates 31 and 32. The clamp plates 31 and 32 are recessed to receive the clamping jaws 33, 34, and 35, 36, which are arranged in pairs opposite each other for holding the work, one pair in each clamp plate. The base 37 of each jaw is extended and the plates 38 are bolted along the upper edge of the clamp plates to overhang the extended base of the jaws and thus hold them in place. Bolted to the plates 31 and 32 in front are the bearing blocks 39, 40, in which are mounted the adjusting screws 41, 42, for each pair of clamp jaws. The screws are threaded in an opposite direction and engage correspondingly threaded recesses in the clamp jaws, so that the rotation of the screws by the handles 43 or 44 will move the jaws to or away from each other. The inner surface of each jaw is formed on an obtuse angle 45, so that the jaws will grasp and hold shafts of any desired diameter.

The work 46 in which the key-seat is to be cut is mounted and clamped by the front pair of jaws 33, 34, and held by the center 47 mounted between the other pair of jaws. Instead of employing a center, the work itself can be mounted between the two pairs of jaws as will be readily understood.

As already described, the milling cutter 21 can be adjusted at the proper height by adjusting the screw 13 with handle 15: and, by sliding the plate 29, the work can be at once brought to the proper position for the milling tool to operate. The work is fed to the milling cutter, as already stated, by means of the screw 26 secured to the clamp frame at one end and mounted in the boss 48 on the main stationary frame 1.

Mounted loosely on the outer end of the screw 26 is a worm gear 49 which is engaged by the worm 50 mounted on the shaft 51 suitably journaled in an arm 52 projecting from the stationary frame. This shaft 51 is driven by the tight gear 53 which meshes with the pinion 54 mounted on shaft 55 suitably journaled in the arm 52, and this shaft 55 also carries the sprocket wheel 56 driven by sprocket chain 57 from the sprocket wheel 58 mounted on the shaft 9, so that during the operation of the machine through this train of gearing, the worm gear 49 is constantly rotated. The worm gear 49 is furnished with a hub 59 which is notched to receive the lug 60 on the sleeve 61 keyed to or slidable on the end of the shaft of the screw. This sleeve 61 is formed with an annular groove 62 which is normally engaged by the bar 63 pivoted at 64 on the frame, the bar 63 being normally held horizontally in engagement with the sleeve by the spring 65. The sleeve 61 is also provided with a second annular groove 66 engaged by an arm 67 pivoted to swing horizontally at 68 to the frame.

A spring, not shown, is provided for the clutch member 61 to throw it out of engagement with the hub on the worm gear when the locking bar 63 is thrown downward out of the groove 62.

Mounted horizontally in a boss 69 on the main clamp frame 22 is a rod 70 held in any desired position by the set screw 71. The outer end of this rod is provided with a bifurcated enlargement 72 and with a beveled block 73. As the clamping device and the work are fed by the rotation of the screw 26, the rod 70 is so adjusted that at a desired point the block 73 will first come in contact with the roller 74 on the end of the bar 63 to throw it out of engagement with the clutch member, and the bifurcated ends 72 will then engage the arm 67 and disengage the clutch from the worm gear, so that the feed of the work will automatically be stopped at the desired point.

For the purpose of cutting internal slots or keyways in collars, hubs and the like, I provide as follows: Mounted in a runway on the rear side of the framework 1 and arranged to slide back and forth is a saw holding frame 75, in which frame is mounted a chuck 76 for holding a saw 77, the chuck holding devices being adjustable by the screw 78. The saw holding frame and saw are reciprocated by the connecting rod 79 coupled at one end to the frame and at the other to the crank stud 80 on the wheel 81. Mounted in the frame and secured to this wheel is the gear 82 which meshes with a loose gear 83 mounted alongside of the gear 53 on the shaft 51. The hub of the loose gear 83 is notched at 84 to receive the lug 85 of the clutch member 86, keyed to but slidable on shaft 51. Normally this clutch is held out of engagement with the loosely mounted gear 83, but when it is desired to drive the saw, the clutch is pushed into engagement, and in this way the crank wheel 81 is rotated to reciprocate the saw holder and saw.

Having thus described my invention, what I claim as new and desire to secure by Letters Patent, is:

1. In a machine of the character specified, a fixed frame, a vertically adjustable frame, and a horizontally adjustable frame mounted on the fixed frame, a rotary milling cutter and train of gearing mounted on the vertically adjustable frame, a feed screw for the horizontally adjustable frame mounted on the fixed frame with gearing for operating the same, and a flexible power transmitting connection for the two sets of gearing, and a spindle for driving the milling cutter, slidingly mounted in the fixed frame.

2. In a machine of the character specified, a fixed frame, and a horizontally adjustable frame mounted on the fixed frame, a feed screw for the adjustable frame mounted on the fixed frame, with gearing for operating the same, a rotary milling cutter with a vertically adjustable frame in which the same is mounted, and a spindle for driving the milling cutter slidingly mounted in the fixed frame, with a train of gearing connecting the spindle with the feed driving gear whereby the rotation of the spindle will drive the rotary cutter and feed the adjustable frame.

3. In a machine of the character specified, a fixed frame, and a horizontally adjustable frame mounted on the fixed frame, a feed screw for the adjustable frame mounted on the fixed frame, worm gear loosely mounted on the shank of the feed screw with worm and gearing for operating the same, and a clutch connecting the worm gear to the screw shaft with an arm adjustably mounted on the adjustable frame to shift the clutch to disconnect the feed screw at any predetermined point of the feed, a rotary milling cutter with a vertically adjustable frame in which the same is mounted, and a spindle for driving the milling cutter slidingly mounted in the fixed frame with power transmitting connection between the gearing for driving the cutter and for feeding the screw.

GEORGE BERGHAUSEN.

Witnesses:
 ARTHUR H. EWALD,
 K. SMITH.

Copies of this patent may be obtained for five cents each, by addressing the "Commissioner of Patents, Washington, D. C."